F. HOLZSCHEITER & T. HEGI.
DOVETAILING MACHINE.
APPLICATION FILED MAY 20, 1907.
916,555.
Patented Mar. 30, 1909.
2 SHEETS—SHEET 2.
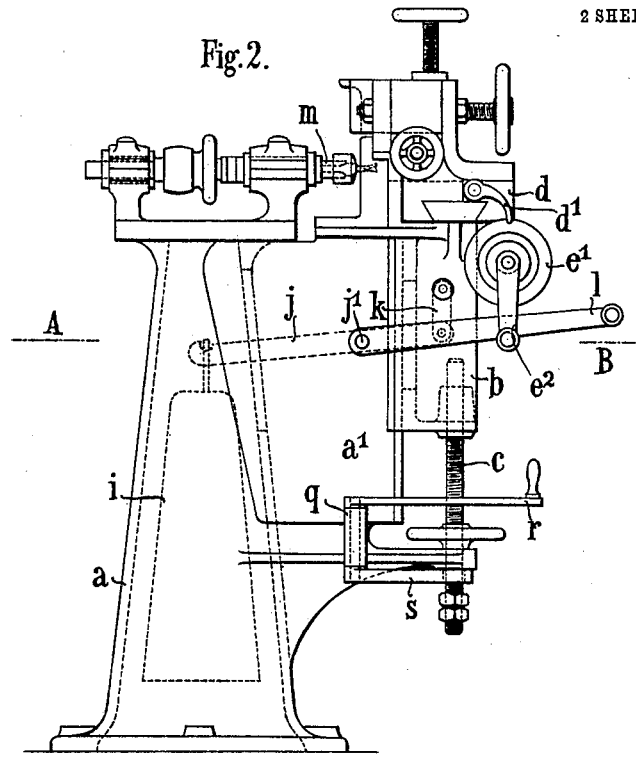
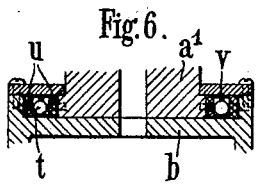
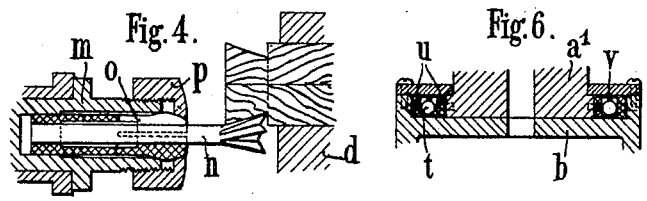
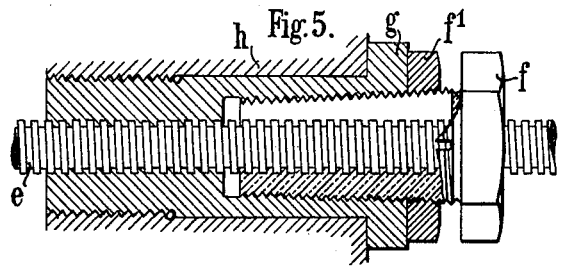
Witnesses,
Alfred Bosshardt.
Stanley E Bramall
Inventors
Friederich Holzscheiter
Theodor Hegi
Per F. Bosshardt.
Attorney

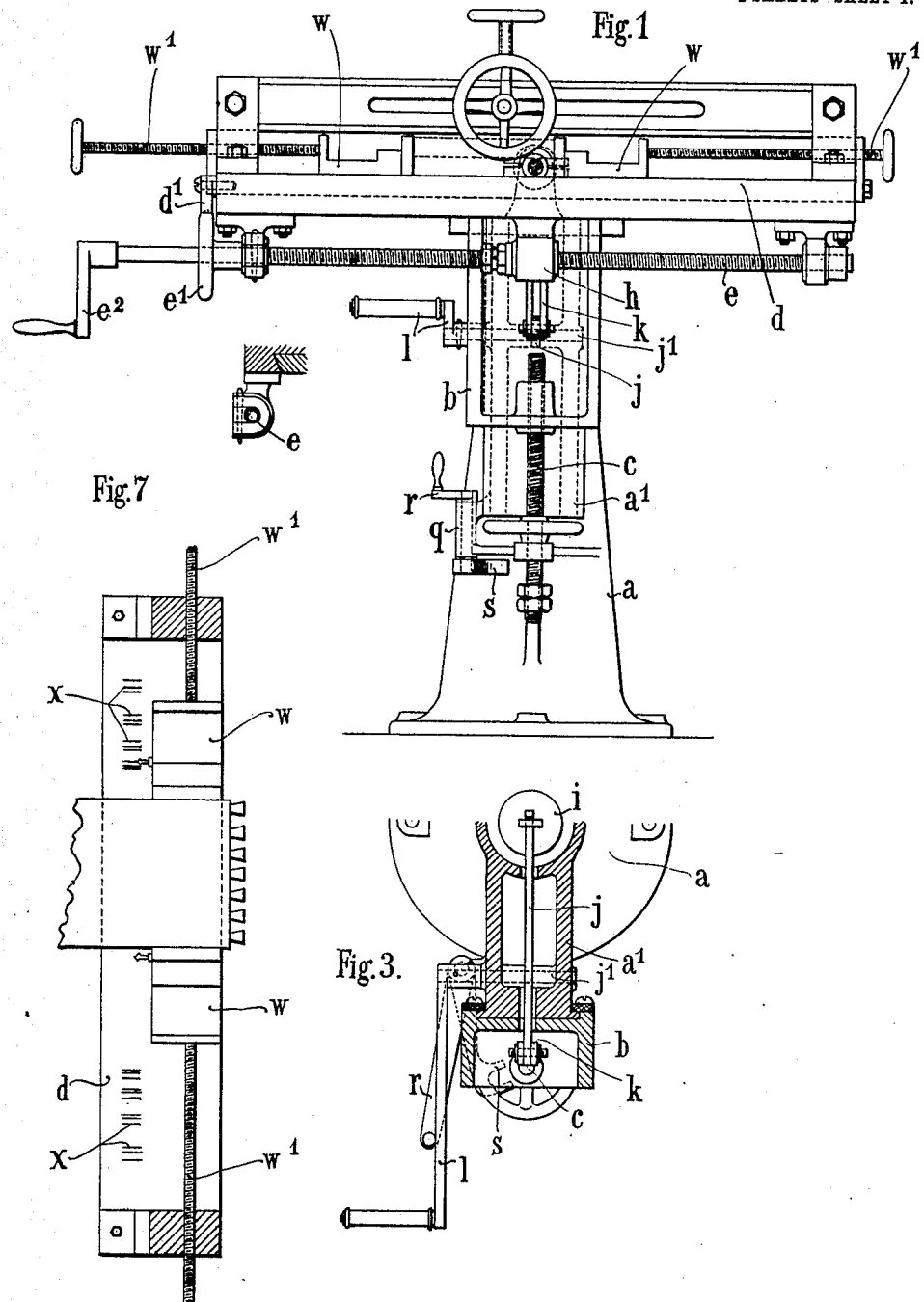

UNITED STATES PATENT OFFICE.

FRIEDERICH HOLZSCHEITER AND THEODOR HEGI, OF ZURICH, SWITZERLAND.

DOVETAILING-MACHINE.

No. 916,555.

Specification of Letters Patent.

Patented March 30, 1909.

Application filed May 20, 1907. Serial No. 374,782.

*To all whom it may concern:*

Be it known that we, FRIEDERICH HOLZSCHEITER and THEODOR HEGI, citizens of Switzerland, and residing at Zurich, Switzerland, have invented new and useful Improvements in Dovetailing - Machines, of which the following is a specification.

This invention relates to improvements in that type of dovetailing machines which have a work slide rendered horizontally adjustable on a vertically movable support by means of a screw threaded spindle and has for its object to provide a machine by which more and better work can be produced than has hitherto been the case. According to our invention the said spindle is provided with a nut having a number of slots. The outside of the said nut is conical, provided with a thread and screwed into a bush secured into the bearing of the support. The said spindle has a hand wheel secured upon one end in the periphery of which is a notch adapted to receive a pawl which rides on the said periphery. The notch and pawl are arranged in such a way that when the hand wheel is turned slowly the pawl falls into the notch and stops the said wheel and when the wheel is turned quickly the pawl passes over the notch. By these means the work slide can be so set horizontally that the tenons are formed accurately at equal distances from each other as when turning the handle slowly the pawl falling into the notch indicates to the operator the completion of a turn of the spindle after which a tenon is formed. When the work is finished and the work holder is to be brought back to its original position, the hand wheel is turned quickly thus obviating the necessity of lifting the said pawl. The said support is balanced by a counter-weight arranged inside the machine stand which carries the said support and work-slide. A setting device is provided whereby the vertical movement of the said support can be limited, to enable of dovetailing two pieces of work and cutting across one side of each piece at one clamping of the work in the slide. The said support is also mounted upon anti-friction balls and thereby rendered easily movable to one side. We attain this object by the mechanism illustrated in the accompanying two sheets of drawings, in which—

Figure 1 is a front view, Fig. 2 a side view, Fig. 3 a section on line A—B of Fig. 2, Figs. 4, 5 and 6 details, and Fig. 7 a sectional plan of the work slide of a machine constructed in accordance with one embodiment of our invention.

Similar letters refer to similar parts throughout the several views.

In carrying out our invention and referring to Figs. 1, 2 and 3, $a$ is the hollow machine stand, and $b$ the support rendered vertically movable and capable of being set in accordance with the depth of the horizontal cut to be made in the work by means of a hand wheel and nuts upon the screw $c$.

The support $b$ on the two sides is mounted upon anti-friction balls $t$ (see enlarged view Fig. 6) employed in holes formed in guides $v$ fixed between two hardened plates $u$ one of which is secured to the bed $a'$ and the other to the support $b$. This arrangement permits of easily adjusting the support $b$ in any position of the work-slide $d$, which is not the case in machines without ball bearings, as when the work-slide is moved to one side on the support its weight will twist and thereby tighten the support on its bed.

The screw $c$ is screwed in the support $b$ and passes through a bearing on the stand $a$. Below the said bearing are two nuts on the screw $c$ and above the same a hand wheel, the said nuts limiting the upward movement and the hand wheel the downward movement of the support $b$ by abutting against the said bearing. The support $b$ has at its top a horizontal bed $b'$ with V edges on which is mounted the work-slide $d$ furnished with the usual clamping device $w$ and a graduated scale $x$ for dividing the work. On the lower side of the work-slide $d$ is mounted the spindle $e$ having a nut $f$ with conical thread externally and four slots. This nut is screwed into a bush $g$ and the latter into a bearing $h$ secured to the carrier $b$. When screwing the nut $f$ inward, its inner slotted end will get pressed together so that it will fit the spindle $e$ accurately and have no backlash. The lock nut $f'$ upon the nut $f$ serves to prevent the bush $g$ from unscrewing accidentally.

One of the bearings in which the spindle $e$ is mounted has a removable step secured by a cotter, see Fig. 1, to enable of removing the spindle quickly. Upon the spindle $e$ is secured a hand wheel $e'$ having a notch in its periphery and to the work-slide $d$ a pawl $d'$ adapted to ride on the said wheel and drop into the said notch. The free end of the said pawl and the said notch are so formed relatively to each other that when turning the spindle $e$ slowly (to the left Fig. 2) the pawl will engage in and fit the said notch exactly and thereby set the spindle, while when turning the latter quickly, it will skip the said notch and permit of moving back the work-slide to its initial position by means of the spindle $e$ without having to raise the pawl. The spindle $e$ is turned by means of a handle $e^2$ secured thereto at one end. The weight of the support $b$ and slide $d$ is balanced by a counter weight $i$ in such a manner that the support and slide will always have a tendency to take up its highest position.

To facilitate the placing of the machine and to give a nice appearance, the counter weight is concealed inside the hollow stand $a$ suspended from the longer arm of a lever $j$ which has its fulcrum $j'$ in the hollow part $a'$ of the stand $a$. The support $b$ is connected with the shorter arm of the lever $j$ by means of two links $k$. To the fulcrum $j'$ is secured outside the stand part $a'$ the crank handle $l$ by means of which the support $b$ and its work-slide $d$ can be moved up or down. The cutter spindle $m$ is mounted in two bearings upon the hollow stand $a$.

In the front end of the cutter spindle $m$ is located a bush $o$ having a ball shaped slotted outer end into which the cutter $n$ is secured by a nut $p$ screwed into the cutter spindle $m$. When drawing tight the nut $p$, the ball shaped part of the bush $o$ is compressed partly by the cutter spindle and partly by the nut $p$ and thereby the cutter $n$ which is of a swallow-tail form clamped fast.

As will be seen from Fig. 4, two pieces of work clamped together one above the other are arranged to be operated upon, the top one having its top side and the bottom one its bottom side cut into in a horizontal direction. In order to enable of cutting the bottom work-piece at its lower side uniformly to the required depth in a horizontal direction, the following setting device is provided. Below at one side of the stand part $a'$ is formed thereon a vertical bearing $q$ in which is mounted a shaft, having at its upper end a crank handle $r$ and at its lower end a lever $s$, which latter is adapted to embrace the spindle $c$ between the nuts on the same and the bearing of the latter on the stand $a$ whereby the vertical movement of the support $b$ can be regulated at will.

The machine described is operated as follows:—The hand wheel and the nuts on the screw $c$ are set, the distance between the hand wheel and upper nut on the screw $c$ being so gaged that in the lowest position of the support $b$, namely when the hand wheel bears against the upper side of the bearing of the screw $c$, the upper piece of work is in the position relative to the cutter $n$ for the horizontal cut to be made in it, and that in the middle position of the support, namely when the upper nut on the screw $c$ bears against the lever $s$, the lower piece of work is in the position relative to the cutter $n$ for the horizontal cut in the same. The highest position is attained when the lever $s$ is disengaged from the screw $c$, the work is then entirely free from the cutter. Two pieces of wood are then so placed upon one another and clamped in the work slide $d$ that the ends to be cut are perfectly flush. The forming of the tenons is then commenced by making vertical cuts through the two pieces of wood. This is done by lowering the work slide, then raising it and afterward turning the hand wheel $e'$ around until the pawl $d'$ again engages in its notch which moves the work slide a distance corresponding with the distance at which the tenons are to be formed. The cutter being still partly in the lower piece of work owing to the position of the nuts on the screw $c$ and the lever $s$, this horizontal movement forms a cut in the under piece of work as far as to the next vertical cut. These operations are repeated until all the vertical cuts have been made in the two and horizontal cuts in the lower piece of wood. When this is attained the work slide is moved to its lowest position and horizontally to its normal position by the hand wheel $e'$ thus forming the horizontal cut across the whole of the upper piece of work. The boards are then unclamped and others placed in position to be operated upon. The operation may also be performed by first forming all the vertical cuts and then forming the horizontal cuts. In this case the lever $s$ is for the first half of the operation disengaged from the screw $c$ so that the cutter does not come into contact with the lower piece of work, and is afterward again engaged for the second half of the operation.

The dovetail mortises of the pieces of work to be connected with those produced as described, are made in the usual way.

In order to enable of varying the distance of the dovetail tenons different spindles $e$ are employed the pitch of each being such that one turn will move the work-slide the desired distance.

By tightening up the nut $f$ backlash of the spindle $e$ can always be prevented and thus the distances of the dovetail tenons formed be always equal.

We claim:

1. In a dovetailing machine, a horizontally adjustable work-slide, a screw-threaded spindle horizontally mounted in bearings thereon, a vertically movable support having a bearing, a bush secured into the said bearing and a split nut having a conical thread on the said spindle screwed into the said bush and means for locking it thereto, all combined substantially as and for the purpose set forth.

2. In a dovetailing machine, a horizontally adjustable work-slide, a screw-threaded spindle horizontally mounted in bearings thereon, a vertically movable support having a bearing, a bush secured into the said bearing and a split nut having a conical thread on the said spindle screwed into the said bush and means for locking it thereto, a hand wheel having a notch in its periphery secured to the said spindle and a pawl pivoted to the said work-slide adapted to engage in the said notch when turning the said hand wheel slowly and to skip the same when turning the hand wheel quickly, all combined substantially as and for the purpose set forth.

3. In a dovetailing machine, a stand, a vertically movable support thereon, a work slide horizontally movable on the said support, a screw carried by the said support, a bearing on the said stand through which the lower end of the said screw projects and movable means above and below the said bearing on the said screw and stand for limiting at will the top and bottom positions of the said support as well as the depth at which the said work slide moves horizontally within the said limits, all combined substantially as and for the purpose set forth.

In witness whereof we have hereunto set our hands in presence of two witnesses.

FRIEDERICH HOLZSCHEITER.
THEODOR HEGI.

Witnesses:
HEINRICH RINDERKNECHT,
A. LIEBERKNECHT.